Patented Dec. 15, 1931

1,836,288

UNITED STATES PATENT OFFICE

LUDWIG SCHMIDT, OF HAMBURG-BERGEDORF, GERMANY, ASSIGNOR TO SOCIETE ALSACIENNE DE PRODUITS CHIMIQUES, OF PARIS, FRANCE, A FRENCH COMPANY

PROCESS FOR OBTAINING BORNYL AND ISOBORNYL ESTERS

No Drawing. Application filed August 20, 1928, Serial No. 300,950, and in France February 18, 1928.

It is known that bornyl and isobornyl esters are produced in good yield and without the formation of undesirable by-products, if pinene or oils containing pinene are heated with organic acids at ordinary pressure with the addition of boron trioxide or of mixed anhydrides of boric acid and another acid as catalysts, until the maximum ester content is obtained. A quantitative esterification does not take place in such a case, but there always remains behind in the reaction mixture a certain percentage of unchanged pinene, which is separated by fractionation from the ester formed and can be used again in the following charge.

It is possible by the present invention also to esterify the major portion of this unchanged residue of pinene, without fractionating it out first, in the same charge by a special subsequent treatment (subsequent esterification), i. e. to improve the final yield of bornyl and isobornyl esters considerably.

For this purpose in the two processes mentioned above, at the end of the operation, as soon as the maximum ester content is obtained, the boron compound (boron trioxide or acetoboric anhydride) which has now fulfilled its purpose as catalyst, and exerts no further action, is first of all removed by suction or centrifuging. The reaction product which is free from boron consists then of a mixture of bornyl and isobornyl esters + excess organic acid + pinene still unchanged.

To this mixture there is added according to the present invention small amounts of a different catalyst, which is capable of further esterifying the major portion of the unchanged pinene and increasing the final yields of bornyl and isobornyl esters by a further 15-20%.

Certain organic and inorganic acids, for instance anhydrous oxalic acid, benzoic acid, ortho phosphoric acid, nitric acid, sulphuric acid, hydrochloric acid etc., are particularly suited as such catalysts. This subsequent treatment (subsequent esterification) under the action of the said catalysts is effected throughout at a relatively low temperature and without the use of pressure. There is no resinification or only a very slight amount.

The present invention has nothing in common with other processes already known. It is particularly noteworthy that in this invention boron compounds are no longer present as catalysts or reaction agents, as these boron compounds have been separated before the addition of the fresh catalysts.

It is therefore a question of a direct conversion of pinene with the said organic acid under the influence of the new catalysts into bornyl and isobornyl esters. For this reason also no such known processes are affected, which have for their object the esterification of pinene with organic acids in the absence of catalysts with or without the use of pressure.

It was not to be foreseen that the subsequent esterification in my invention in the presence of organic or inorganic acids as contact substances would supply exclusively bornyl and isobornyl esters, because it is a known fact that the many sided reactivity of pinene can, according to the circumstances yield derivatives.

*Example 1.*—136 kgs. pinene are boiled in a known way with 120 kgs. glacial acetic acid and 10 kgs. boron trioxide under reflux until a constant ester content is reached, thereupon cooled to room temperature and the boron trioxide withdrawn by suction. The acid filtrate is stirred with 5 kgs. anhydrous oxalic acid at 55–60° until the ester content no longer rises and thereupon the excess glacial acetic acid expelled in a vacuum.

By this subsequent treatment with anhydrous oxalic acid as catalyst, the pure ester content of the crude ester experiences an appreciable increase. It now amounts on an average to 65–70% as compared with 45–55% before the after-treatment. The crude ester is then purified in a known manner and saponified, a mixture of pure borneol and isoborneol of melting point 197–199° C. being obtained.

*Example 2.*—136 kgs. pinene are heated with 120 kgs. glacial acetic acid and 10 kgs. acetoboric anhydride in a known manner under reflux until a constant ester content is obtained which amounts on an average to 50–55%, the mass is thereupon cooled and the acetoboric anhydride withdrawn by suction. The acetic acid filtrate is shaken with 5 kgs. ortho-phosphoric acid of specific gravity 1.700 for several hours at 100–105° C. When the ester content no longer increases, the re-action is ended and the excess glacial acetic acid distilled off. The remaining crude ester, which has increased on an average 65–70% by the after-treatment with phosphoric acid as catalyst, is further treated as in Example 1.

Having now described my invention, what I claim as new and desire to secure by Letters Patent is:—

1. In the process of obtaining bornyl and isobornyl esters by heating pinene with an aliphatic mono-carboxylic acid in the presence of aceto boric anhydride, the feature that after the maximum content of ester has been obtained the re-action mixture is cooled, the aceto boric anhydride removed therefrom and the re-action mixture is then submitted to further esterification in the presence of an acid catalyst.

2. In the process as claimed in claim 1 the feature that ortho-phosphoric acid is used in the acid catalyst.

In testimony whereof I affix my signature.

DR. LUDWIG SCHMIDT.